INVENTORS
KARL N. REID
ALLISON R. WILLIAMS
BY
Cameron, Kerkam & Sutton
ATTORNEYS

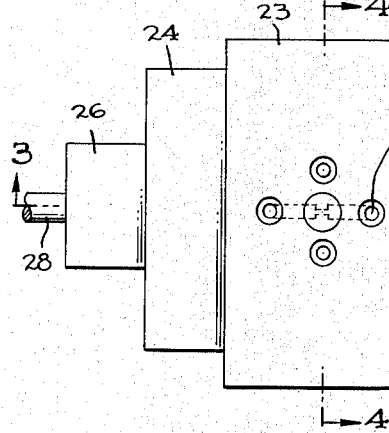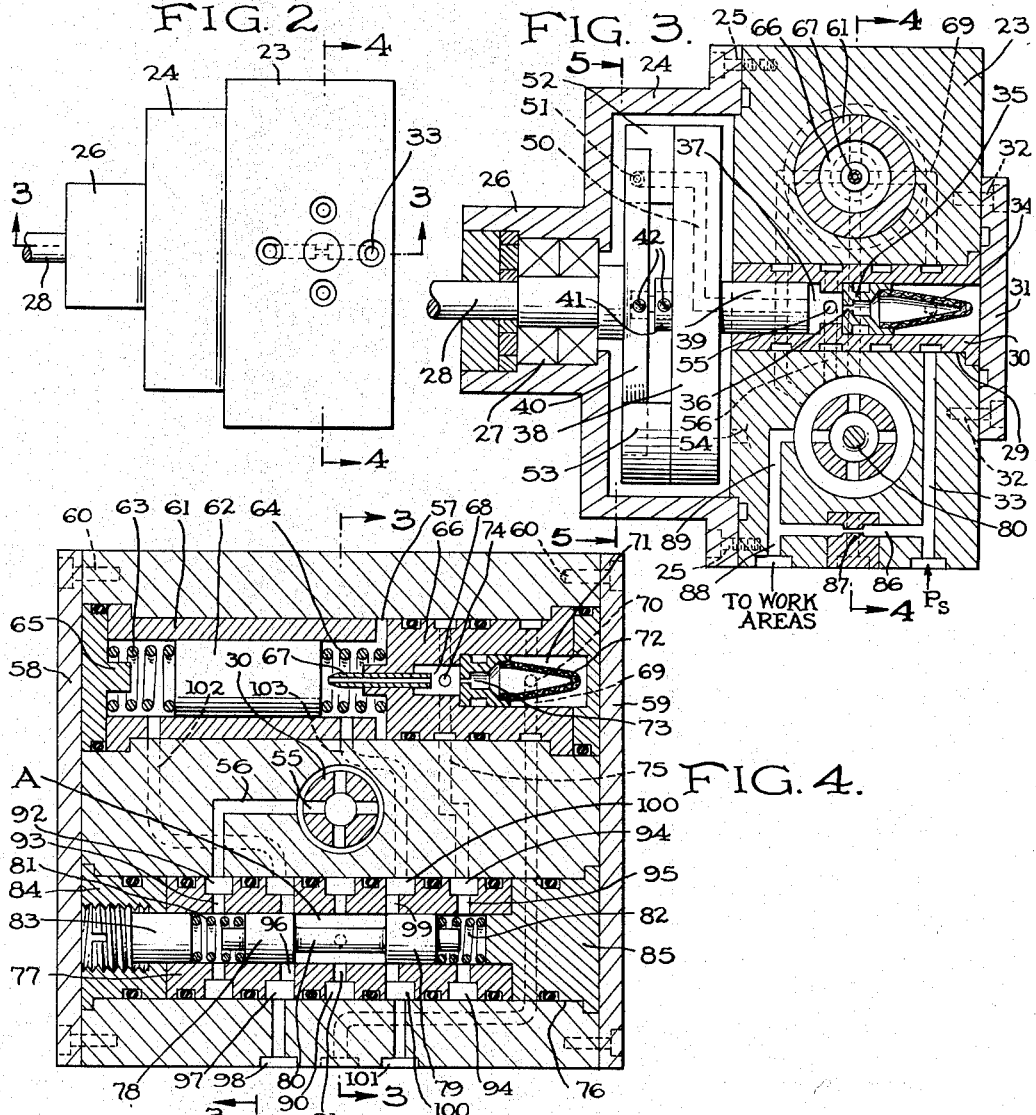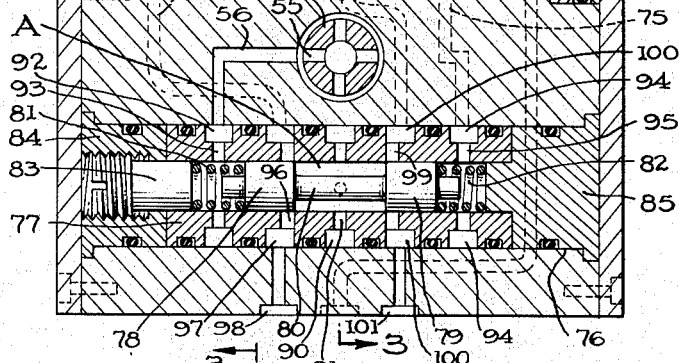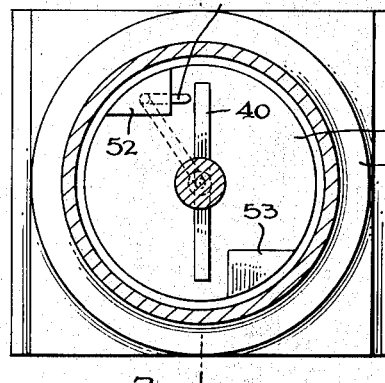

United States Patent Office 3,224,278
Patented Dec. 21, 1965

3,224,278
CONTROL VALVE SYSTEM RESPONSIVE TO DIFFERENCES BETWEEN INDEPENDENT INPUT SIGNALS
Karl N. Reid, Arlington, Mass., and Allison R. Williams, 380 Newbury St., Danvers, Mass.; said Reid assignor to said Williams
Filed Aug. 21, 1963, Ser. No. 303,559
10 Claims. (Cl. 73—510)

This invention relates to control valve means of the liquid or gas operated type.

The chief object of the invention is to provide a control valve means of the liquid or gas operated type that will control the fluid pressure supplied to a desired work area external to the control means, for example, a piston-cylinder device, in such a way that this pressure varies as a function of the difference between two signals. To this end, the control valve mechanism comprises three fluid pressure amplifiers, each preferably of the type having a fixed resistance or orifice upstream with respect to the load, and a variable resistance or orifice downstream with respect to the load. By regulating the variable resistances of two of said amplifiers according to their respective input signals, the correspondingly regulated but amplified output pressures of these two amplifiers can be utilized in opposition to control the variable resistance of the third amplifier, thereby simultaneously effecting a comparison and differentiation of the two signals and producing a third amplified output pressure which is controlled as a function of the difference between the signals.

It is another and more specific object of the invention to control the pressure supplied to a desired external member so that the pressure is proportional to the absolute value of the difference between two signal inputs, one being a signal proportional to the angular velocity or angular acceleration of a rolling body such as a wheel rolling on a supporting surface with or without slipping, and the other being a signal proportional to the linear velocity or acceleration parallel to the ground of the body to which the wheel is attached. It will be understood by those skilled in the art that, if desired, the linear velocity of the body may be measured in terms of the angular velocity of another wheel which rolls on the supporting surface without slipping.

In addition to control of the pressure supplied to the external member as set forth in the preceding objects, the invention involves also the use of any suitable mechanical, electrical or electro-mechanical transducer for converting the desired input signals into the desired mechanical motions of the control valve mechanism. For example, typical electro-mechanical transducers, which are well known in practice, include voice coils, D.C. torque motors and solenoids. Various other types of transducers will be familiar to those skilled in the art.

To avoid confusion, the third fluid pressure amplifier mentioned above will be referred to hereinafter as the main control valve of the mechanism, this valve comprising a valve body and a valve member which on displacement provides a variable orifice downstream with respect to the load take-off to the external work area. This main valve thus controls the direction and magnitude of the flow rate and the magnitude of the fluid pressure supplied to the external work area. The valve member moves in response to differences in the output pressures of the first two amplifiers.

It will be understood that the two amplifiers and the main control valve (or third amplifier) may be of any suitable type known to the art. A wide number of commercially available fluid power servo valves can be used, various types being described for example in Section 21 of McGraw-Hill's Handbook of Fluid Dynamics, by J. L. Shearer; in an article by B. A. Johnson et al., entitled "What To Look for in Electrohydraulic Servo Valves," published in Control Engineering for June, 1956; in books such as Fluid Power Control, by J. F. Blackburn et al., published jointly by the Technology Press of M.I.T. and John Wiley and Sons, Inc., New York, 1960, and Control System Components, by J. E. Gibson et al., McGraw-Hill Book Co., Inc., New York, 1958; and in various other similar and known works.

Although as already stated the control valve mechanism may be either liquid or gas operated, the principles are the same in either case and it will, therefore, suffice to restrict the following more detailed description to liquid operated or hydraulic valve mechanism.

Also, by way of exemplification, the main control valve (i.e., the third fluid pressure amplifier) will be assumed to be a two-metering-land spool-type valve normally maintained in a center position by mechanical centering springs. Hydraulic supply pressure, either constant or variable, is supplied to the upstream side of a fixed orifice and passages lead from the downstream side of this fixed orifice to the valve chamber and to the external member. Passages in the valve body, which are situated adjacent to and are controlled by the corresponding metering lands, lead to the exhaust or fluid sump. Similar spool-type valves have been used in a wide number of industrial and military applications, the example described specifically hereinafter being an adaptation of the four-way spool valve used in a wide number of commercially available fluid power servo valves as shown in the publications mentioned above. Other suitable four-way valves shown in these publications are two-variable, two-fixed orifice flapper-nozzle valves; four-way jet-nozzle valves; four-way sliding-plate valves; and four-way poppet valves.

Similarly, the pair of hydraulic amplifiers may be any of various types shown in the aforesaid publications, such as three-way poppet valves, three-way spool valves, and three-way jet-nozzle valves. As described hereinafter, by way of exemplification, each hydraulic amplifier is a three-way control valve of the flapper-nozzle type, employing a fixed area upstream metering orifice and a variable area downstream metering orifice. In each amplifier, fluid is supplied at constant pressure to the upstream side of the fixed-area metering orifice. The area of the downstream orifice in each amplifier is varied as a result of the motion of the flappers relative to the nozzles in response to the respective input signals, these signals being proportional to the angular and linear accelerations (or decelerations), respectively, or the angular and linear velocities, respectively, as discussed above. In the case where the input signals are supposed to be angular and linear acceleration signals, respectively, appropriate spring - mass - damper mechanisms may be used to generate mechanical forces proportional to the respective independent accelerations and these forces may be transformed mechanically into movements of the flappers of the hydraulic amplifiers.

In other cases where the independent input signals are proportional to angular and linear accelerations, or to angular and linear velocities, and whether they be electrical, mechanical, fluid, thermal, or other signals, suitable transducers are used to convert the signals into motions of the respective flappers of the hydraulic amplifiers. For example, one particular embodiment as described below comprises electrical tachometers or the like for measuring the two velocities, the electrical outputs of the tachometers constituting electrical voltages proportional to the respective velocities; and electro-mechanical transducers which convert these electrical voltages into proportional mechanical motions of the respective flappers.

In many cases it is preferable to provide a common source of constant supply pressure, with three passages leading through fixed orifices to the three-fluid pressure amplifiers.

The accompanying drawings, for purposes of illustration, show a valve control mechanism of the species mentioned above, together with its use with both signals proportional to accelerations and signals proportional to velocities, but it is to be understood that these drawings are by way of example only and are not to be taken as a definition of the limits of the invention, reference being had to the appended claims for this purpose.

In the drawings,

FIG. 2 is a bottom plan view of an embodiment of the invention in which spring-mass-damper means are employed for producing mechanical forces proportional to accelerations and applying these forces to the hydraulic amplifiers;

FIG. 3 is a section on the line 3—3 of FIGS. 2, 4 and 5;

FIG. 4 is a section on the line 4—4 of FIGS. 2 and 3;

FIG. 5 is a section on the line 5—5 of FIG. 3;

Figure 1:
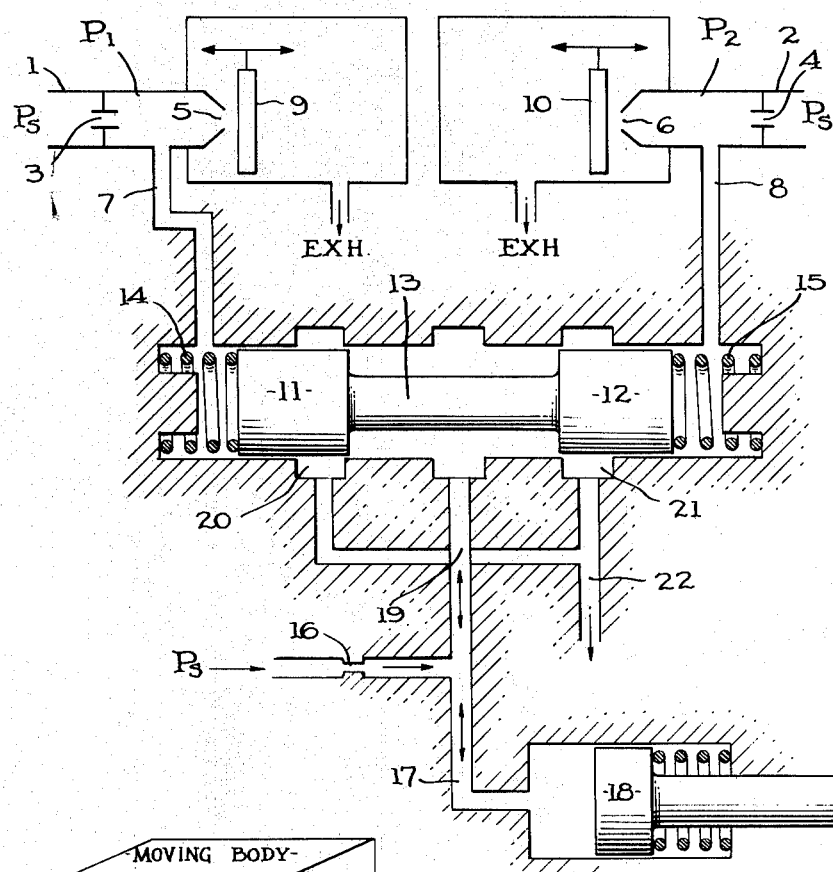
FIG. 1 is a schematic diagram illustrating the principles of the invention, as embodied in a hydraulic control valve mechanism of the type mentioned above.

Referring first to FIG. 1, the two three-way valve-type hydraulic amplifiers comprise chambers $P_1$ and $P_2$, fluid under constant pressure $P_s$ being supplied by lines 1 and 2 to orifices 3 and 4 and flowing therethrough into the chambers through nozzles 5 and 6 and then out of the chambers through the exhaust passages "EXH." Each chamber is also connected to an end of the main control valve referred to below by suitable connecting passages 7 and 8. Motion of the flappers 9 and 10 causes proportional changes in the respective chamber pressure $P_1$ and $P_2$. The pressure $P_1$ in one chamber and in the passage 7 is, therefore, seen to be proportional to the input signal which controls the flapper 9, and the pressure $P_2$ in the other chamber and in the passage 8 is seen to be proportional to the other input signal which controls the flapper 10. These chamber pressures may be made to vary in a linear proportional fashion with respect to the corresponding input signals or they may be made to vary in a non-linear proportional fashion, the types of variation being functions of the practical design, desired performance, and intended application.

The main control valve comprises a main valve member of the spool-type, having two metering lands 11 and 12 connected by a rod 13 of reduced cross section providing a main valve chamber A. This spool is slidable axially, in a bore in the valve body, but is normally maintained in the neutral position shown in FIG. 1 by suitable centering springs 14 and 15 in the ends of the bore. The fluid under pressure $P_s$ passes through a fixed orifice 16, from which one passage 17 leads to an external work member here shown diagrammatically as a piston 18, and from which another passage 19 leads to the central portion of the valve body. The metering lands 11 and 12 control the exhaust passages 20 and 21, and the other passage 22 to the sump.

The operation of the invention can be described as follows (again referring to the schematic representation of FIG. 1). An angular acceleration (or deceleration) or velocity signal results in a proportional motion of flapper 9 and therefore a proportional change of the chamber pressure $P_1$. A linear acceleration (or deceleration) or velocity input signal results in a proportional motion of flapper 10 and therefore a proportional change of chamber pressure $P_2$. The difference between the two pressures $P_1$ and $P_2$ multiplied by the area of the main valve member end 11 or 12 is a force which tends to move the main valve member a proportional amount in one direction or the other from its center position. The direction of motion of the main valve member depends on the sign of the pressure difference and the extent of motion depends on the spring constant of the centering springs. As the main valve member moves in either direction from its center position, there is flow of fluid from the line 17 connected to the external member, in which the fluid pressure is to be controlled, to the exhaust 22. The result of the valve motion is a reduction of the fluid pressure to be controlled by an amount proportional to the magnitude of the motion of the main valve member (measured from a neutral position) and independent of the direction of the motion of the main valve member from the neutral position. The overall result of the operation is that the pressure and flow rate supplied to the external member are proportional to the absolute value of the difference between the angular and linear accelerations or velocities or other input signals. The static and dynamic performance factors may be set and/or proportioned, within reasonable limits, through appropriate selection of the sizes of the various parts of the mechanism.

Those versed in the art will recognize certain similarities and also certain differences between the control valve mechanism shown diagrammatically in FIG. 1 and typical so-called electrohydraulic servo valves. In particular, valve mechanisms embodying the present invention may be referred to as a "two-stage" hydraulic control valve in the same sense as the valves disclosed in U.S. Patent Nos. 2,884,906 and 2,884,907, in which a single input signal, usually in the form of an electrical voltage or current, is converted into a mechanical motion of a first-stage hydraulic amplifier by means of an electromechanical transducer (e.g., of the D.C. torque motor type), and the output of the first-stage hydraulic amplifier is a differential fluid pressure which is applied to the second-stage hydraulic amplifier (i.e., the high power stage) to move its valve member (e.g., the spool) by an amount proportional to the output of the first-stage amplifier. Valve mechanism embodying the present invention is similar in that it is a two-stage valve, the "combined" output from the first-stage hydraulic amplifiers is a differential pressure signal which is applied to the second stage hydraulic amplifier, and the motion of the second-stage valve member is proportional to the combined output of the first-stage.

However, two independent input signals are fed into the system instead of a single input signal, and each signal is independently converted into a mechanical motion of one of the first-stage hydraulic amplifiers by means of a suitable mechanical, electromechanical, thermomechanical, etc. transduction means. Hence, the flow rate and/or pressure controlled by the second-stage amplifier are proportional to the absolute value of the difference between the two independent input signals. The system output is, therefore, independent of the absolute magnitudes of the separate input signals.

FIGS. 2–6, inclusive, illustrate the details of an embodiment of the invention in which the valve mechanism, together with suitable devices responding to accelerations, are all combined in a compact light-weight assembly which needs only to be connected to a suitable pressure fluid supply and exhaust. This device comprises a rectangular metal block 23 having a cylindrical casing 24 secured to one side thereof in any suitable manner as by means of screws 25. The casing 24 has a portion 26 of reduced diameter which houses a bearing 27 for a rotating shaft 28 connected to the wheel or other rotating body, the angular acceleration of which is to be sensed.

In axial alignment with the shaft 28, the block 23 has a bore 29 lined by a sleeve 30, the outer end of which is closed by a cover plate 31 suitably secured on the block 23 as by means of screws 32. The sleeve 30 is arranged to provide a desired constant fluid pressure supply to a flapper-nozzle device responsive to acceleration of the rotating body to which the shaft 28 is connected. The pressure fluid $P_s$ from any desired source passes through a passage 33 in the block 23 and enters the end of sleeve 30 outside a suitable screen 34. This screen is mounted in a fitting 35 inside the sleeve 30, the fitting having a restricted orifice 36 which allows the pressure fluid to pass into a chamber 37.

A small flywheel 38 rotates in the cylindrical casing 24, having a hub 39 that is rotatably mounted in the open end of sleeve 30. The shaft 28 and the flywheel 38 are suitably connected so that they normally rotate together but in case of deceleration of the shaft 28, the flywheel 38 can overrun the shaft against spring tension. Preferably this is accomplished by a resilient driving connection between the shaft and the flywheel of the flexural pivot type shown in detail in FIG. 6. The shaft 28 carries at its inner end a bar 40 designed to function as a flapper as hereinafter described, the section of this bar around the axis of the shaft 28 being recessed to receive one end of the flexural pivot shown in FIG. 6, the other end of said pivot being similarly inserted in a recess formed in a central boss 41 on the flywheel 38 and both connections being secured by setscrews 42.

Figure 6:
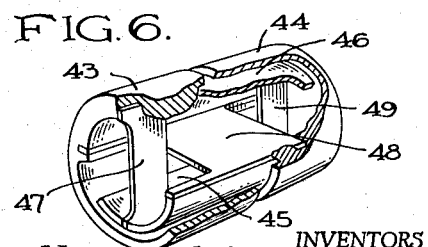
FIG. 6 is a detailed perspective view of a part of the device shown in FIGS. 2–5.

Referring to FIG. 6, the flexural pivot device forming the resilient driving connection between the flapper bar 40 and flywheel 38 comprises an outer cylindrical shell 43 at one end and a similar outer cylindrical shell 44 at the opposite end, each shell having a section of reduced diameter which extends into the other shell as shown at 45 and 46. These two shells are connected with one another by suitable spring plates 47, 48 and 49 to provide driving connection capable of limited angular travel depending upon the flexure of the spring plates. Such a flexural pivot between the flapper bar 40 and the flywheel 38 permits limited regular angular movement in case of overrun due to deceleration.

Flapper bar 40 is arranged to cooperate with a nozzle carried by the flywheel and receiving pressure fluid from the chamber 37 mentioned above. For example, the flywheel hub 39 and the flywheel itself are provided with passages 50 which conduct the pressure fluid from the chamber 37 to a small nozzle 51 mounted in a block 52 on the flywheel. For symmetry and balance, a similar block 53 is mounted on the flywheel diametrically opposite the block 52. The arrangement of the nozzle 51 relative to the flapper bar 40 is most clearly shown in FIG. 5. Liquid passing through the variable orifice formed by the nozzle and flapper bar discharges into the cavity of the casing 24, where it acts as a damping fluid for the rotating parts and from which it is discharged to exhaust in any suitable manner, as indicated diagrammatically at dotted lines 54.

It will be seen accordingly that the pressure $P_1$ in the chamber 37 varies as a function of angular deceleration of the shaft 28. This pressure $P_1$ is applied by means of a port 55 in the wall of the chamber 37 and a passage 56 to the main control valve described hereinafter.

The block 23 is also provided with another bore 57 at a right angle to the bore 29, the opposite ends of which are closed by cover plates 58 and 59 suitably secured to the ends of the block 23 as by means of screws 60. This bore 57 serves as a housing for a spring-mass device responsive to linear acceleration, which suitably comprises a bushing 61 mounted in the bore 57, a mass 62 slidable in the bushing 61, and centering springs 63, 64 at the opposite ends of the mass. These springs may be supported in any suitable manner, as for example, by a spring seat 65 at one end of the sleeve and a spring seat 66 mounted in the bore 57 adjacent the other end of the bushing 61. The mass or weight 62 cooperates with the end of a nozzle 67 mounted in the spring seat member 66 and communicating with a pressure chamber 68 therein, the nozzle and weight forming the second flapper-nozzle of the second hydraulic amplifier. The fluid supplied at constant pressure $P_s$ passes through the passage 33 to the sleeve 30 as already described and thence through a second passage 69 to a port 70 in the wall of a chamber 71 in the end of spring seat member 66. Fluid from this chamber 71 passes through a suitable screen 72 to a fixed orifice 73 discharging into the chamber 68. The pressure $P_2$ in this chamber, which varies under the control of the flapper-nozzle 62, 67, passes out of the chamber through a port 74 in its wall and thence through a suitable passage 75 to the main control valve described below.

Another bore 76 extends through the block 23 parallel to the bore 57 and at right angles to the bore 29, and this bore 76 houses the main control valve. As shown, this valve comprises a hollow sleeve 77 having a plurality of grooves or channels extending around its outer surface at longitudinally spaced points and connected by suitable ports with the hollow center of the sleeves. Slidably mounted in this sleeve is the main valve member which comprises metering lands 78 and 79 at its opposite ends and connected by a rod 80 of reduced diameter. This main valve member or spool is normally centered in neutral position shown in FIG. 4 by means of centering springs 81 and 82 mounted in sleeve 77 at the opposite ends of the spool and retained by an adjustable plug 83 threaded in a bushing 84 at one end, and by a fixed plug 85 at the other end of the bore 76.

The fluid under pressure $P_s$ passes from the passage 33, already mentioned, through the passage 86 and a restricted orifice 87, similarly to the orifice 16 of FIG. 1, the fluid then branching through the passage 88 to the external work area and through the passage 89 to a groove or channel 90 in the valve sleeve 77, from which it enters the central part of the valve body through suitable ports 91. As long as the valve member remains in the neutral position shown in FIG. 4, however, this pressure fluid does not escape from the valve sleeve, as explained above in connection with FIG. 1.

Meanwhile the position of the valve member is also controlled by the difference between pressures $P_1$ and $P_2$ in the chambers 37 and 68, respectively. To this end, the passage 56 leads to a groove or channel 92 in the valve sleeve which is connected by ports 93 with the spring chamber at one end of the movable valve member. Similarly, the passage 75 leads to a groove or channel 94 in the valve member which is connected by ports 95 with the spring chamber at the other end of the main valve member. Thus the pressures $P_1$ and $P_2$ act in different directions on the valve member so that, as explained in connection with FIG. 1, a differential between these pressures will cause the main valve member to move in one direction or the other. When it moves to the left, the metering land 78 will open its ports 96 to main valve chamber A such that fluid flows from passage 89 through channel 97 and exhaust port 98 at the bottom of block 23, or if the valve member moves in the other direction, the metering land 79 opens its ports 99 to the main valve chamber A such that fluid flows from passage 89 through channel or groove 100 and the exhaust port 101 in the bottom of block 23. As described in connection with FIG. 1, therefore, the differential between pressures $P_1$ and $P_2$ is effected to reduce the pressure output to the work area by an amount proportional to the differential pressure, or in other words, the differences between the input signals which in this embodiment are responsive to angular and linear accelerations.

It will be understood, of course, that the arrangement of the various drilled passages mentioned above can be varied as may be desired for manufacturing convenience. For example, any suitable exhaust passage may be provided from the spring chambers at the ends of the inertia mass or weight 62, and are here shown diagrammatically as passages 102 and 103 leading respectively to the exhaust grooves or channels 97 and 100 of the valve sleeve.

Figure 7:
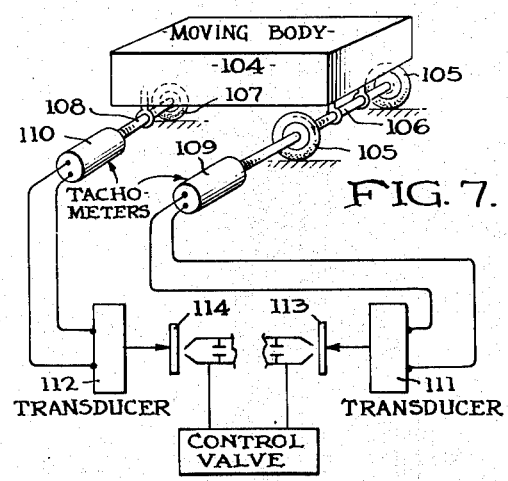
FIG. 7 is a diagrammatic view showing an embodiment of the invention in which the input signals are proportional to wheel velocities.

FIG. 7 illustrates schematically an embodiment of the invention already mentioned above in which the signals are measures of the angular and linear velocities rather than accelerations. By way of illustration, the block 104 represents any type of moving body, here shown as supported by a pair of wheels 105 and axle 106 and by a wheel 107 and an axle 108. The two axles drive electrical tachometers 109 and 110, and the electrical outputs of these tachometers are utilized in the transducers 111 and 112 to control the mechanical motion of the flappers 113 and 114, respectively, these being parts of a control valve means or system of the type described above in connection with FIG. 1. It will be seen that if one of the wheels, for example, the wheel 107, is a freely rotating wheel, its angular velocity will be a measure (within a known constant) of the linear velocity of the moving body 104 parallel to the ground. The same will be true of the wheels 104 and 105 so long as they maintain true rolling contact with the supporting surface or ground, but in the event of slippage, their velocity will decrease and the movements of the flappers 113 and 114 will then be unequal so as to create a differential pressure in the control valve means as already described.

It will be understood that the invention is not limited to the embodiments particularly described above and illustrated in the drawings, but is capable of various modifications that will now suggest themselves to those skilled in the art. Furthermore, as already indicated, various types of valves are available for the purposes of the invention, and the selection of the type of valve best fitted for any given conditions will readily be made by those skilled in the art. Broadly speaking, control valve means embodying the invention, whether liquid or gas operated, can be used in any case where a control is to be effected according to a differential between two input signals, and these input signals need not be functions of accelerations or angular velocities which have been mentioned particularly for purposes of illustration of the use of the invention. For example, the embodiment shown in FIGS. 2-5 inclusive is well adapted for use for the purposes described in U.S. Patent No. 2,529,985, granted November 14, 1950 to Allison R. Williams. It is to be understood that in view of the variety of modifications and applications of the invention that can be made, reference should be had to the appended claims for a definition of its limits.

What is claimed is:

1. Control valve means for modulating a pressure output in proportion to the absolute value of the difference between two independent input signals comprising three fluid pressure amplifiers each having a pressure chamber, a normally constant pressure supply line connected thereto and having a fixed orifice therein, and a movable member providing a variable discharge orifice therefor, two of said amplifiers being mechanically independent of each other and each having its movable member controlled independently of the other by a single input signal so that the pressure in its pressure chamber is proportional to said single input signal, and means biasing the movable member of said third amplifier to neutral position, said movable member of the third amplifier being moved in response to the pressures in the pressure chambers of the first two amplifiers acting in opposition on said movable member to adjust the variable orifice of said third amplifier in proportion to the absolute value of the difference between said independent input signals regardless of direction and absolute level thereof and thereby to modulate the pressure output of said third amplifier.

2. Control valve means as defined in claim 1 in combination with controlled working means comprising a pressure chamber to which the modulated pressure output of said third amplifier is connected and a pressure responsive element in said chamber which is biased toward normal position and is movable from said normal position by an amount proportional to said modulated pressure output.

3. Control valve means as defined in claim 1, said independent input signals being proportional respectively to linear and angular accelerations of a moving body having rolling contact with a supporting surface, and said output pressure being proportional to the absolute value of the difference between said independent input signals.

4. Control valve means as defined in claim 1, said independent input signals being proportional respectively to linear and angular velocities of a moving body having rolling contact with a supporting surface, and said output pressure being proportional to the absolute value of the difference between said independent input signals.

5. Control valve means as defined in claim 1 comprising a sleeve, a spool movable axially in said sleeve, a chamber in said sleeve at each end of said spool, fluid inlet and outlet ports in said sleeve with which said movable spool cooperates to provide variable valve orifices, a pressure supply line having a normally constant pressure and a restriction orifice therein for supplying fluid pressure to a work area external to said valve means, a T-connection from said line at a point downstream from said orifice to a fluid inlet port of said sleeve, and means for regulating the position of said sleeve comprising two mechanically independent and independently operating fluid pressure amplifiers each controlled by a separate independent input signal, each of said amplifiers comprising a pressure chamber, a pressure supply line having a normally constant pressure and a fixed orifice therein and connected to said pressure chamber, a load outlet connecting each pressure chamber to one of said sleeve chambers, whereby said spool is subjected to the independently controlled fluid pressure outputs of said pressure chambers acting in opposite directions, a discharge nozzle for each pressure chamber, and movable members controlled independently by said separate input signals, one of said members cooperating with each nozzle to provide a variable discharge orifice for its associated pressure chamber.

6. Control valve means as defined in claim 5, including a source of normally constant supply pressure common to said supply line and fluid pressure amplifiers, said pressure source connected to each thereof through a restriction orifice.

7. Control valve means as defined in claim 5, wherein one of said fluid pressure amplifiers is responsive to angular acceleration of a rolling body, in combination with a rotatably mounted inertia member carrying one of said nozzles and a rotatably mounted flapper member cooperating with said nozzle, yieldable means connecting said rotatably mounted inertia member and flapper for normal rotation as a unit, and means connecting a part of said unit for rotation with said rolling body, said yieldable means capable of yielding to allow relative angular displacement of said inertia member and flapper.

8. Control valve means as defined in claim 7, said yieldable means comprising a flexural pivot.

9. Control valve means as defined in claim 5, comprising a housing member having three bores therein, said sleeve and spool mounted in one of said bores, each of the other two bores comprising one of said pressure chambers and its associated orifice, a pressure supply port in said housing, passages in said housing member leading from said supply port to said other two bores, an output pressure port, in said housing for supplying said pressure fluid to said work area, a passage in said housing including said first-named restriction orifice and leading from said supply port to said output pressure port, and another passage in said housing providing said T-connection.

10. Control valve means as defined in claim 5, wherein one of said fluid pressure amplifiers is responsive to linear acceleration, in combination with a seismic mass movable in said valve means in response to changes in linear velocity thereof, and resilient means opposing movement of said mass from normal position, said mass constituting one of said movable members and cooperating with one of said nozzles to provide the variable discharge orifice for its associated pressure chamber.

(References on following page)

References Cited by the Examiner

UNITED STATES PATENTS

| | | | |
|---|---|---|---|
| 2,125,101 | 7/1938 | Cook et al. | 303—21 |
| 2,405,382 | 8/1946 | Volet | 73—515 |
| 2,423,057 | 6/1947 | Thomas et al. | 303—21 X |
| 2,884,907 | 5/1959 | Atchley | 137—48 |
| 2,892,660 | 6/1959 | Reswick et al. | 188—181 X |
| 2,913,072 | 11/1959 | Williams | 303—21 X |
| 2,920,924 | 1/1960 | Reswick et al. | 73—515 X |
| 2,944,526 | 6/1960 | Jarvis | 73—514 X |
| 2,977,985 | 4/1961 | Ericson et al. | 137—625.61 |
| 3,025,670 | 3/1962 | Russ | 60—39.28 |
| 3,047,010 | 7/1962 | Rothfuss | 137—489 |

FOREIGN PATENTS 360,099   9/1922   Germany.

RICHARD C. QUEISSER, *Primary Examiner.*

MARTIN P. SCHWARDON, J. J. GILL,
*Assistant Examiners.*